United States Patent
Jereczek et al.

(10) Patent No.: US 10,715,437 B2
(45) Date of Patent: Jul. 14, 2020

(54) DEADLINE DRIVEN PACKET PRIORITIZATION FOR IP NETWORKS

(71) Applicant: Intel Corporation, Santa Clara, CA (US)

(72) Inventors: Grzegorz Jereczek, Gdansk (PL); Maciej Andrzej Koprowski, Gdansk (PL); Piotr Wysocki, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 82 days.

(21) Appl. No.: 16/047,445

(22) Filed: Jul. 27, 2018

(65) Prior Publication Data
US 2019/0044857 A1    Feb. 7, 2019

(51) Int. Cl.
*H04L 12/741* (2013.01)
*H04L 12/751* (2013.01)
*H04L 29/12* (2006.01)
*H04L 12/851* (2013.01)
*H04L 12/875* (2013.01)

(52) U.S. Cl.
CPC ............ *H04L 45/745* (2013.01); *H04L 45/02* (2013.01); *H04L 47/24* (2013.01); *H04L 47/562* (2013.01); *H04L 61/2007* (2013.01)

(58) Field of Classification Search
CPC ... H04L 45/745; H04L 45/02; H04L 61/2007; H04L 47/24; H04L 47/562; H04L 49/9036; H04L 49/9047; H04L 12/4015
See application file for complete search history.

(56) References Cited

U.S. PATENT DOCUMENTS

| | | | | |
|---|---|---|---|---|
| 6,801,943 B1 * | 10/2004 | Pavan | ............... | G06F 9/4887 709/226 |
| 2002/0031086 A1 * | 3/2002 | Welin | ............... | G10L 25/78 370/229 |

(Continued)

OTHER PUBLICATIONS

Mittal, "Timely: RTT-based Congestion Control for the Datacenter", 14 pages, Google, Inc.

(Continued)

*Primary Examiner* — Jung Liu
(74) *Attorney, Agent, or Firm* — Compass IP Law, PC

(57) ABSTRACT

Examples may include an apparatus having a packet receiver to receive a packet, the packet including a packet header having a deadline and a destination network node. The apparatus includes a routing table including a current latency for a path to the destination network node for the packet. The apparatus further includes a reprioritization component to get the deadline for delivery of the packet to the destination network node, to set a remaining time for the packet to the deadline minus a current time, to subtract the current latency from the remaining time when the packet is to be routed, and to assign the packet to one of a plurality of deadline bins based at least in part on the remaining time, each deadline bin associated with one of a plurality of transmit queues, the plurality of deadline bins arranged in a deadline priority order from a highest priority to a lowest priority. The apparatus also includes a packet transmitter to transmit packets from the plurality of transmit queues, the plurality of transmit queues being accessed in the deadline priority order.

16 Claims, 11 Drawing Sheets

(56) References Cited

U.S. PATENT DOCUMENTS

| | | | |
|---|---|---|---|
| 2004/0160922 A1* | 8/2004 | Nanda | H04L 1/0002 370/335 |
| 2005/0213587 A1* | 9/2005 | Cho | H04L 47/14 370/395.42 |
| 2009/0080451 A1* | 3/2009 | Gogic | H04L 47/10 370/412 |
| 2010/0165830 A1* | 7/2010 | Amir | H04L 45/04 370/216 |
| 2013/0250792 A1* | 9/2013 | Yoshida | H04L 49/9036 370/252 |
| 2014/0185628 A1* | 7/2014 | Matthews | H04L 47/50 370/412 |
| 2018/0077171 A1* | 3/2018 | Ramanujan | H04L 63/1408 |

OTHER PUBLICATIONS

Perry, "Fastpass: A Centralized 'Zero-Queue' Datacenter Network", SIGCOMM14, 12 pages.
Wilson, "Better Never than Late: Meeting Deadlines in Datacenter Networks", Microsoft Research, 12 pages, Cambridge UK.

\* cited by examiner

US 10,715,437 B2

DEADLINE DRIVEN PACKET PRIORITIZATION FOR IP NETWORKS

TECHNICAL FIELD

Examples described herein are generally related to processing of packets in a computing system.

BACKGROUND

In digital communications networks, packet processing refers to the wide variety of techniques that are applied to a packet of data or information as it moves through the various network elements of a communications network. There are two broad classes of packet processing techniques that align with the standardized network subdivisions of control plane and data plane. The techniques are applied to either control information contained in a packet which is used to transfer the packet safely and efficiently from origin to destination or the data content (frequently called the payload) of the packet, which is used to provide some content-specific transformation or take a content-driven action. Within any network enabled device (e.g. router, switch, firewall, network element or terminal such as a computer or smartphone) it is the packet processing subsystem that manages the traversal of the multi-layered network or protocol stack from the lower, physical and network layers all the way through to the application layer.

Quality of service (QoS) is the description or measurement of the overall performance of a service, such as a computer network or a cloud computing service, particularly the performance seen by the users of the network. To quantitatively measure quality of service, several related aspects of the network service are often considered, such as packet loss, bit rate, throughput, transmission delay, availability, jitter, etc.

In the field of computer networking and other packet-switched telecommunication networks, quality of service refers to traffic prioritization and resource reservation control mechanisms rather than the achieved service quality. Quality of service is the ability to provide different priority to different applications, users, or data flows, or to guarantee a certain level of performance to a data flow.

Advances have been made in providing appropriate QoS in networks, but existing approaches are not optimized to meet deadlines originating from service level agreements (SLAs).

DETAILED DESCRIPTION

Embodiments of the present invention disclose a dynamic in-network QoS traffic packet priority assignment technique.

An absolute deadline is embedded for each packet of a communications flow subject to QoS into the Internet Protocol (IP) options fields in the packet header and current network latency is maintained to all subnets in a routing table. With this information, every router dynamically assigns an appropriate priority to each packet. In this way, packets with the shortest deadline (e.g., higher priority) may be transmitted sooner than those with more relaxed deadlines (e.g., lower priority), taking into account the entire packet route. Switches may operate solely on the deadline embedded in the IP header of each packet. When using embodiments of the present invention, static assignment of flows to traffic classes is no longer used.

Figure 1:
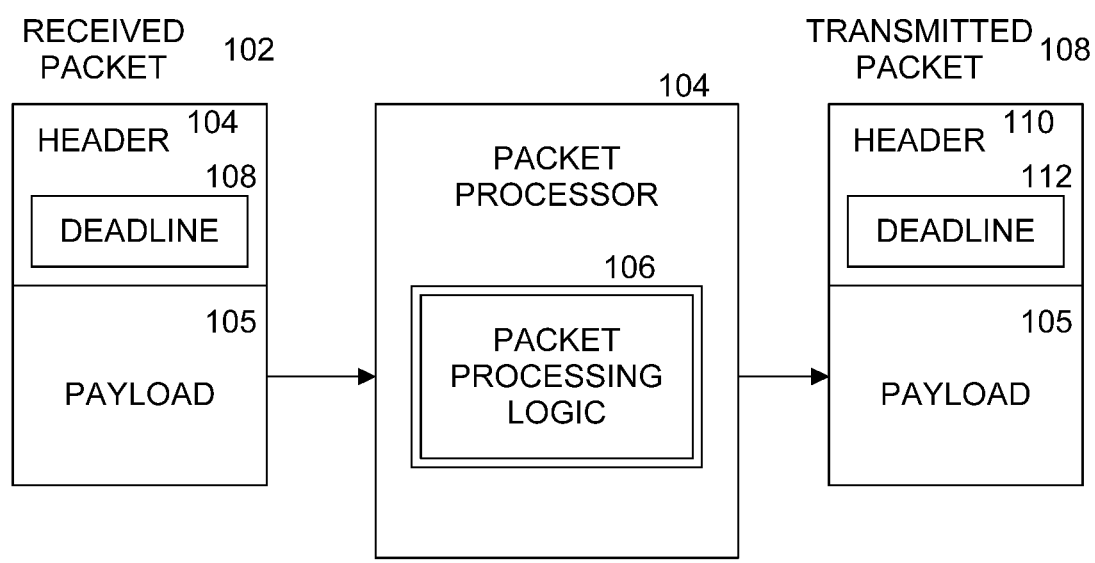
FIG. 1 illustrates an example of a packet processing system.

FIG. 1 illustrates an example of a packet processing system. A received packet 102 includes a packet header 104 and a packet payload 105. The packet header includes multiple fields. In an embodiment, packet header 104 includes a deadline 108. In an embodiment, deadline 108 is included in an IP options field in the packet header. A packet processor component 104 handles a received packet by applying packet processing logic 106 to one or more of packet header 104 and packet payload 105. Based on application of packet processing logic 106, packet processor 104 transmits the packet (e.g., as transmitted packet 108) onward in a computing system or network for further processing. Transmitted packet 108 includes packet header 110 and deadline 112, which may have the same or different values as packet header 104 and deadline 108 of the received packet.

Figure 2:
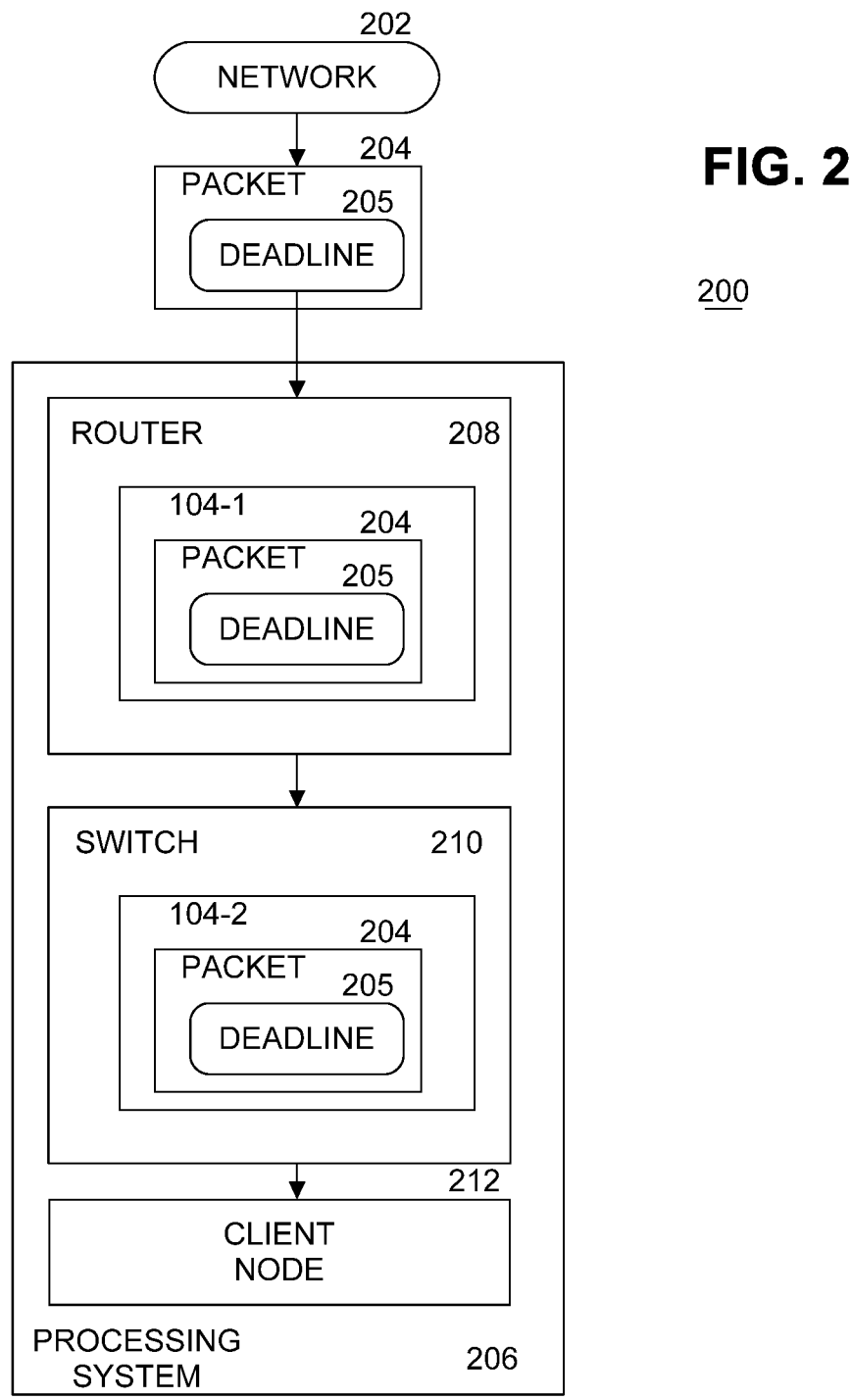
FIG. 2 illustrates an example of packet processing components in a computing platform.

FIG. 2 illustrates an example 200 of packet processing components in a processing system 206. An incoming packet 204 having deadline 205 is received from a network 202, such as the Internet, for example, by processing system 206. Processing system 206 may be any digital electronics device capable of processing data. Processing system 206 includes one or more components that processes packet 204.

For example, processing system 206 includes router 208. Router 208 is a networking device that forwards data packets between computer networks. Routers perform the traffic directing functions on the Internet. A data packet is typically forwarded from one router to another router through the networks that constitute an internetwork until it reaches its destination node. A router is connected to two or more data lines from different networks. When a data packet comes in on one of the lines, the router reads the network address information in the packet to determine the ultimate destination. Then, using information in its routing table or routing policy, it directs the packet to the next network on its journey. The most familiar type of routers are home and small office routers that simply forward Internet Protocol (IP) packets between the home computers and the Internet. An example of a router would be the owner's cable or DSL router, which connects to the Internet through an Internet service provider (ISP). More sophisticated routers, such as enterprise routers, connect large business or ISP networks up to the powerful core routers that forward data at high speed along the optical fiber lines of the Internet backbone.

In an embodiment, router 208 includes packet processor 104-1 (i.e., an instantiation of packet processor 104). Router 208 forwards packet 204 at least in part according to deadline 205.

For example, processing system 200 also includes switch 210. A switch is a device in a computer network that connects together other devices. Multiple data cables are plugged into a switch to enable communication between different networked devices. Switches manage the flow of data across a network by transmitting a received packet only to the one or more devices for which the packet is intended. Each networked device connected to a switch can be identified by its network address, allowing the switch to direct the flow of traffic maximizing the security and efficiency of the network.

In an embodiment, switch 210 includes packet processor 104-2. Switch 210 forwards packet 204 to client node 212 based at least in part on deadline 205.

For example, processing system 206 also includes client node 212. Client node 212 may be a computing system such as a laptop or desktop personal computer, smartphone, tablet computer, digital video recorder (DVR), computer server, web server, consumer electronics device, or other content producer or consumer.

Although router 208, switch 210, and client node 212 are all shown in the example processing system 206 in a pipeline design, packet processor 104 according to the present disclosure may be included "stand-alone" in processing system 206, or in any combination of zero or more of router 208, switch 210, client node 104, or in other components in processing system 206. In the example shown in FIG. 2, when one or more of packet processor 104-1 in router 208 and packet processor 104-2 in switch 210, then client node 212 can use the packet's payload for further processing in the client node. In various embodiments, router 208, switch 210, and client node 212 are implemented by one or more of hardware circuitry, firmware, and software, including network virtualized functions (NVFs).

Figure 3:
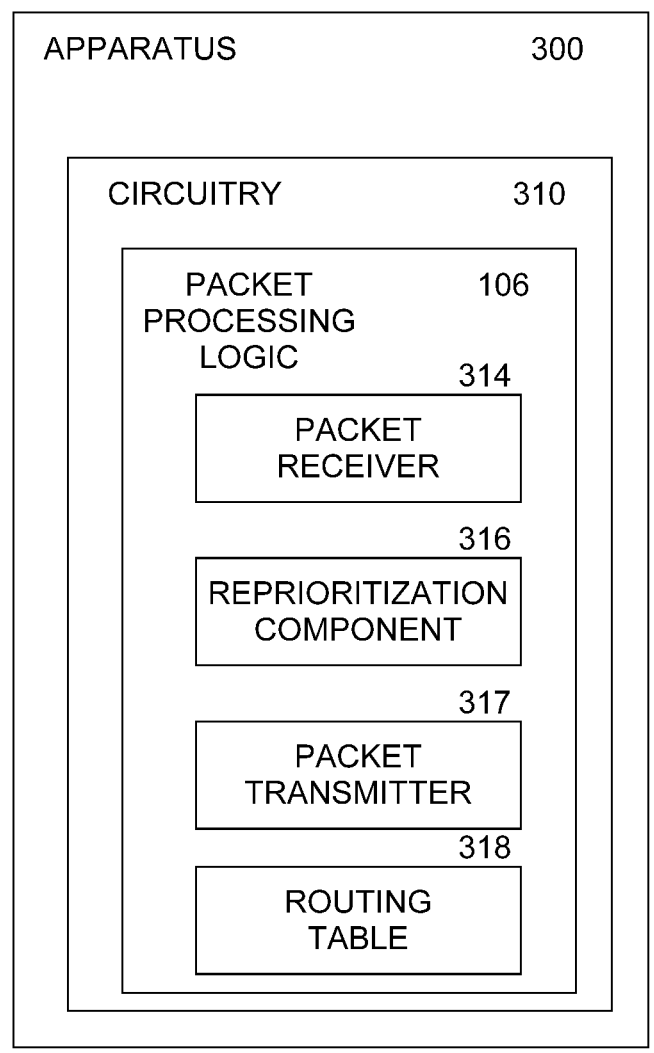
FIG. 3 illustrates an example apparatus for packet processing.

FIG. 3 illustrates an example apparatus. Although apparatus 300 shown in FIG. 3 has a limited number of elements in a certain topology, it may be appreciated that the apparatus 300 may include more or less elements in alternate topologies as desired for a given implementation.

According to some examples, apparatus 300 is associated with logic and/or features of packet processing logic 106. In an embodiment, packet processing logic 106 is an implementation of packet processor 104 as shown in FIG. 1, and/or packet processor 104-1 and/or 104-2 as shown in FIG. 2, in a processing system such as processing system 206, and supported by circuitry 310. According to embodiment, packet processing logic 106 includes packet receiver component 314 to process received packet 102, reprioritization component 316 to analyze a deadline of the received packet and to reprioritize packets for transmission, and packet transmitter component 317 to transmit one or more packets. In an embodiment, packet processing logic 106 also include routing table 318. For these examples, circuitry 310 is incorporated within one or more of circuitry, processor circuitry, a processing element, a processor, a central processing unit (CPU) or a core maintained at processing system 206. Circuitry 310 is arranged to execute one or more software, firmware or hardware implemented modules, components or packet processing logic 106. Module, component or logic may be used interchangeably in this context. The examples presented are not limited in this context and the different variables used throughout may represent the same or different integer values. Also, "logic", "module" or "component" also includes software/firmware stored in computer-readable media, and although the types of logic are shown in FIG. 3 as discrete boxes, this does not limit these components to storage in distinct computer-readable media components (e.g., a separate memory, etc.).

In an embodiment, circuitry 310 is all or at least a portion of any of various commercially available processors, including without limitation an Intel® Atom®, Celeron®, Core (2) Duo®, Core i3, Core i5, Core i7, Itanium®, Pentium®, Xeon®, Xeon Phi® and XScale® processors; or similar processors, or Advanced Reduced Instruction Set Computing (RISC) Machine (ARM) processors. According to some examples, circuitry 310 also includes an application specific integrated circuit (ASIC) and at least some of packet processing logic 106 is implemented as hardware elements of the ASIC. In an embodiment, packet processing logic is implemented entirely in an ASIC. According to some examples, circuitry 310 also includes a field programmable gate array (FPGA) and at least some packet processing logic 106 is implemented as hardware elements of the FPGA. In an embodiment, packet processing logic is implemented entirely in a FPGA.

According to some examples, apparatus 300 includes packet processing logic 106. Packet processing logic 106 is executed or implemented by circuitry 310 to perform processing as described with reference to FIGS. 4-5 described below.

Various components of apparatus 300 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Figure 4A:
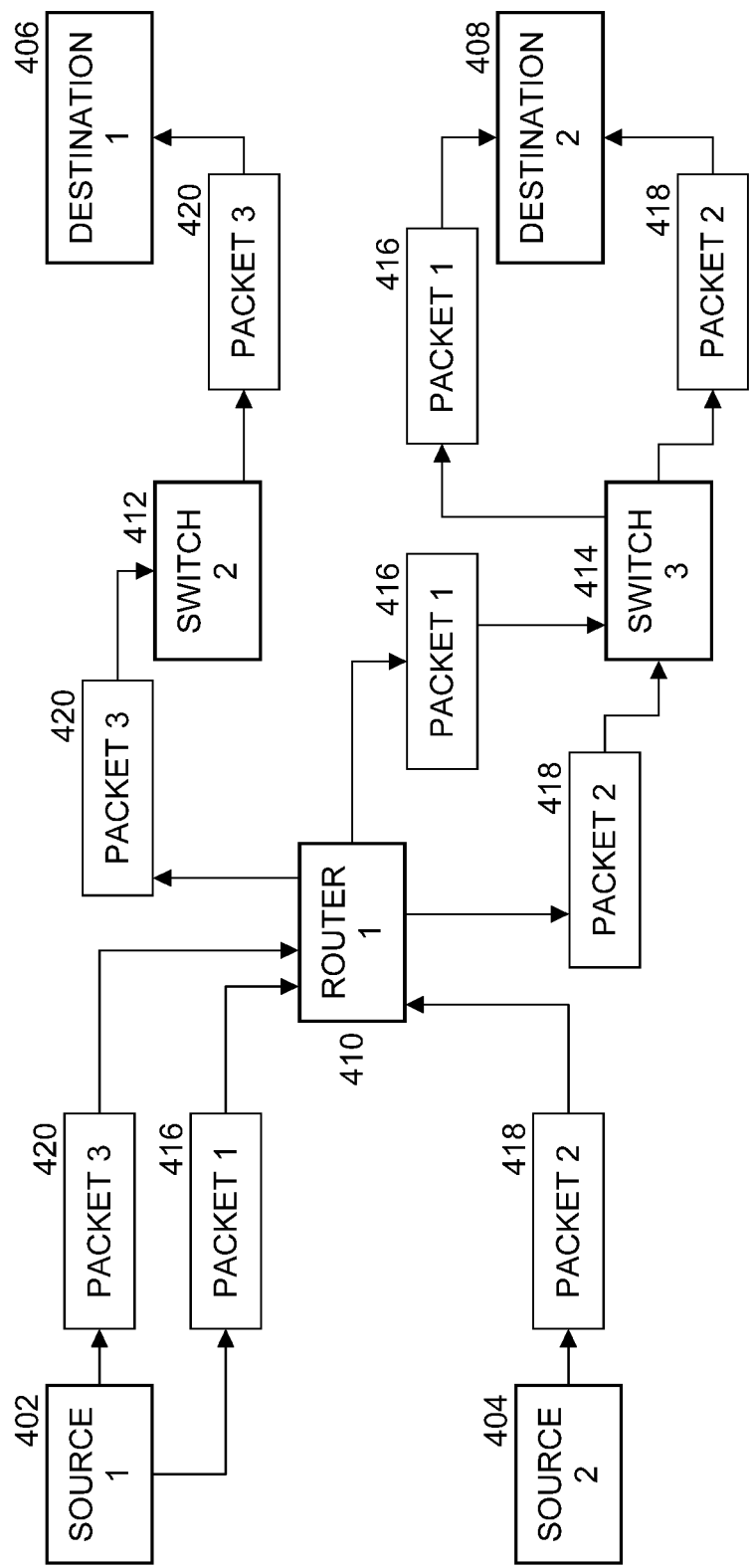
FIGS. 4a, 4b, 4c, and 4d illustrate an example of three packets being processed from a source to a destination.

FIGS. 4a, 4b, 4c, and 4d illustrate an example of three packets being processed from a source to a destination. Let's assume in this example that a network has two sources (source 1 402 and source 2 404), two destinations (destination 1 406 and destination 2 408), one router (router 1 410), and two switches (switch 2 412 and switch 3 414) as shown in FIG. 4A. In other examples any number of sources, destinations, routers, and switches are possible, in any combination. In this example, three packets arrive at router 1 410 in short bursts one after another in sequence. For example, packet 1 416 arrives at router 1 410, followed by packet 2 418, and then by packet 3 420.

Figure 4B:
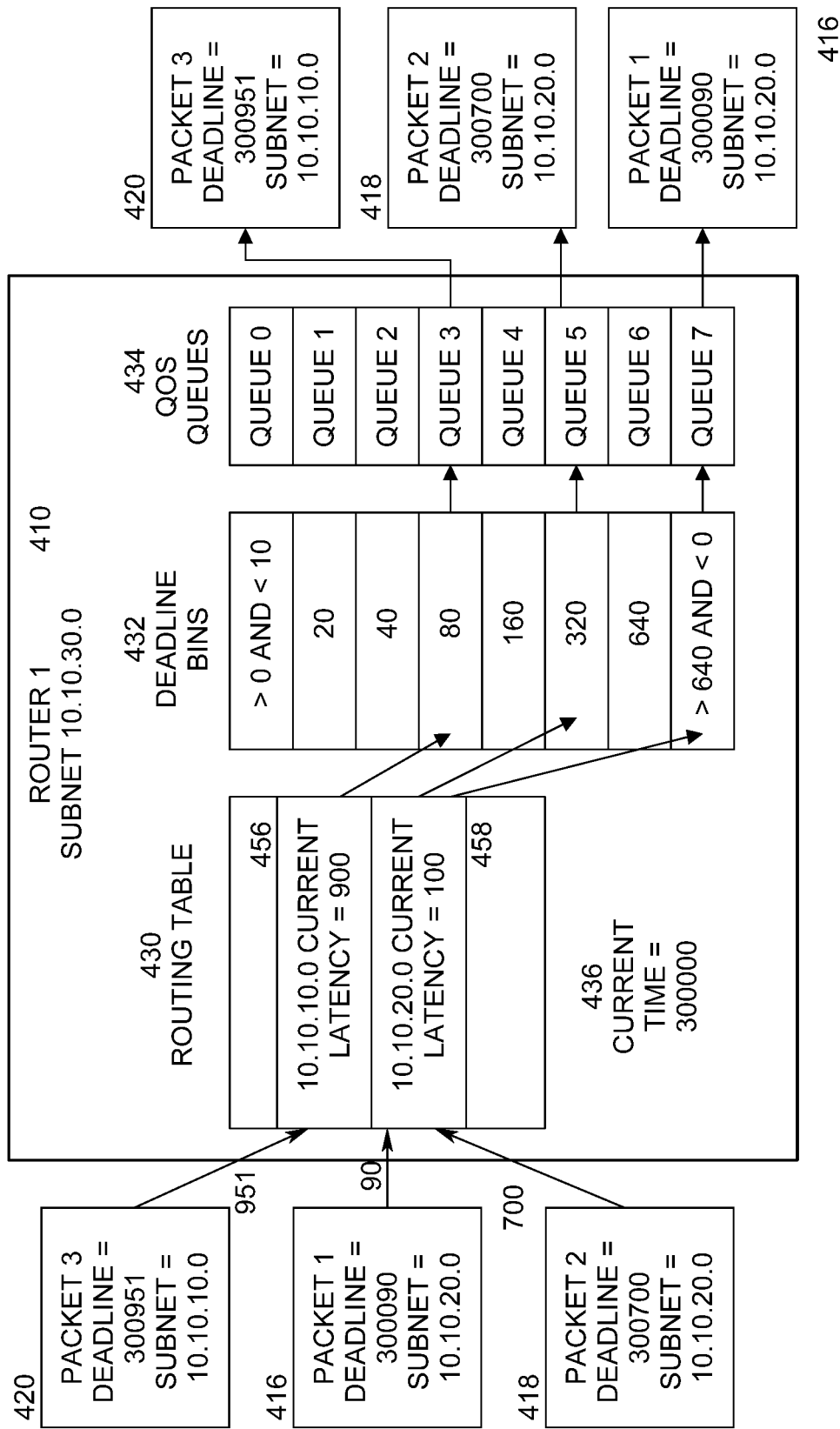

Turning now to FIG. 4b, router 1 410 has a subnet IP address in this example of 10.10.30.0. Router 1 410 includes routing table 430. In an embodiment, routing table 430 is extended from known routing tables by including current latency fields for transmission of packets to other nodes in a network. For example, routing table 430 includes a field for a current latency for a path to a network node having subnet IP address of 10.10.10.0 (switch 2 412 in this example). In this example, the current latency 456 for subnet 10.10.10.0 is 900 microseconds. Routing table 430 also includes a field for a current latency for a path to a network node having subnet IP address of 10.10.20.0 (switch 1 414 in this example). In this example, the current latency 458 for subnet 10.10.20.0 is 100 microseconds.

Packet processing logic 104-1 maintains an up-to-date value for the current latency for routes to each node in the network. In an embodiment, the current latencies are periodically updated using a programmatic interface, such as OpenFlow (a communications protocol that gives access to the forwarding plane of a network switch or router, available at www.opennetworking.org/software-defined-standards/specifications/), a command line interface (CLI), or other technique. In another embodiment, the current latencies are updated using an autonomous method. For example, an application on each deadline-aware network node could periodically monitor latencies to other routers using an Internet control message protocol (ICMP) (available at www.tools.ietf.org/html/rfc792). An optimization could involve exchange of this information between different network nodes using known routing protocols.

In an embodiment, each packet header includes a deadline for delivering the packet and an identifier of the last network node forwarding the packet prior to the destination (e.g., a subnet IP address). Thus, in this example, packet 1 416 has a deadline of 300090 and a subnet of 10.10.20.0 (i.e., switch 3 414), packet 2 418 has a deadline of 300700 and a subnet of 10.10.20.0 (i.e., switch 3 414), and packet 3 has a deadline of 300951 and a subnet of 10.10.10.0 (i.e., switch 2 412). Packet processing logic 104-1 (not shown in FIG. 4b) in router 1 410, based on the current time 436 in router 1 410, calculates the remaining time to the deadline for each packet based at least in part on the deadline information in the packet headers. For example, remaining time for packet 1 is 90 microseconds (300090–300000), remaining time for packet 2 is 700 microseconds (300700–300000), and remaining time for packet 3 is 951 microseconds (300951–300000). Then, based on the information in routing table 430, expected latency to the destination subnet is subtracted from those remaining times. For example, remaining time for packet 1 416 is computed to be –10 microseconds (90–100), remaining time for packet 2 418 is 600 microseconds (700–100), and remaining time for packet 3 420 is 51 microseconds (951–900).

Packet processing logic 104-1 then assigns each packet to a selected one of a plurality of deadline bins 432 based on the packet's remaining time. For example, packet 3 420 is assigned to the deadline bin with a limit of 80 microseconds (because the remaining time for packet 3 420 is less than 80 microseconds but more than 40 microseconds), packet 2 418 is assigned to the deadline bin of 320 microseconds (because the remaining time for packet 2 is less than 640 microseconds but more than 320 microseconds), and packet 1 416 is assigned to the deadline limit of 640 microseconds or more and less than 0 microseconds (because the remaining time for packet 1 is –10 microseconds). In this example, packet 3 is assigned to the fourth deadline bin, packet 2 is assigned to the sixth deadline bin, and packet 1 is given no priority since packet 1 has already missed its deadline. Packet 1 is assigned to the lowest priority deadline bin. In this example, packet 3 is going to be transmitted out of router 1 410 before the other packets because packet 3 is assigned to a higher priority deadline bin than packet 1 and packet 2. Packet 2 is going to be transmitted out of router 1 410 before packet 1 because packet 2 is assigned to a higher priority deadline bin than packet 1. The assigned time limits for each deadline bin are implementation dependent. The number of deadline bins are also implementation dependent.

In an embodiment, each deadline bin 432 is associated with a corresponding one of a plurality of QoS queues 434 (e.g., transmit queues). Packet processing logic 104-1 processes the packets in QOS queues 434 when transmitting the packets onward to their destination. In one embodiment, packet processing logic 104-1 processes packets in queue order, i.e., first queue 0, then queue 1, then queue 2, and so on to a last queue 7 (for example). This order is the same as a deadline priority order from highest priority to lowest priority. Packets assigned to a higher priority deadline bin and associated QoS queue are transmitted before packets assigned to a lower priority deadline bin and associated QoS queue. There may be any number of QoS queues, matching the number of deadline bins. In other embodiments, other schemes for processing the queues may be used, such as a weighted round robin approach. In any case, the order of processing packets within QoS queues 434 is implementation dependent. By assigning packets to deadline bins corresponding to QoS queues, embodiments of present invention can reprioritize handling of packets based at least in part on the packet deadlines.

Figure 4C:
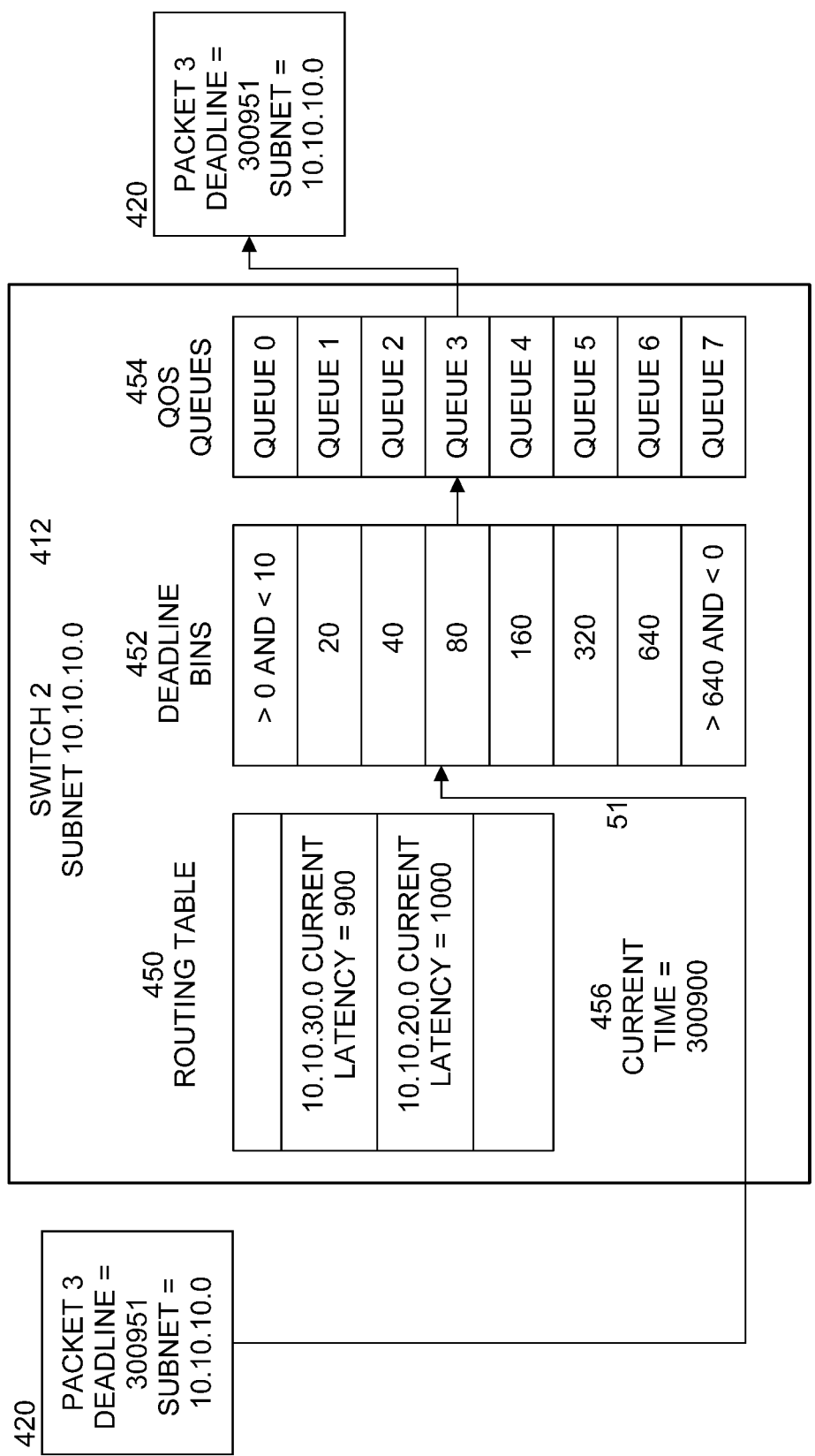

Turning now to FIG. 4c, switch 2 412 has a subnet IP address in this example of 10.10.10.0. Switch 2 412 receives packet 3 420 from router 1 410. Because this network node is a switch coupled to a destination (i.e., the switch is a destination subnet), routing table 450 is not used for packet 3 (no routing is necessary). Priority assignment is based on the deadline in the packet header. Packet processing logic 104-2 (not shown in FIG. 4c) in switch 2 412, based on the current time 456 in switch 2 412, calculates the remaining time to the deadline for each packet based at least in part on the deadline information in the packet headers. For example, remaining time for packet 3 is 51 microseconds (300951–300900). Packet processing logic 104-2 assigns packet 3 420 to the deadline bin 452 with a limit of 80 microseconds (because the remaining time for packet 3 is less than 80 microseconds but more than 40 microseconds). In an embodiment, each deadline bin 452 is associated with a corresponding QoS queue 454. Packet processing logic 104-2 processes QoS queues 454 and transmits packet 3 from queue 3 to destination 1 406.

Figure 4D:
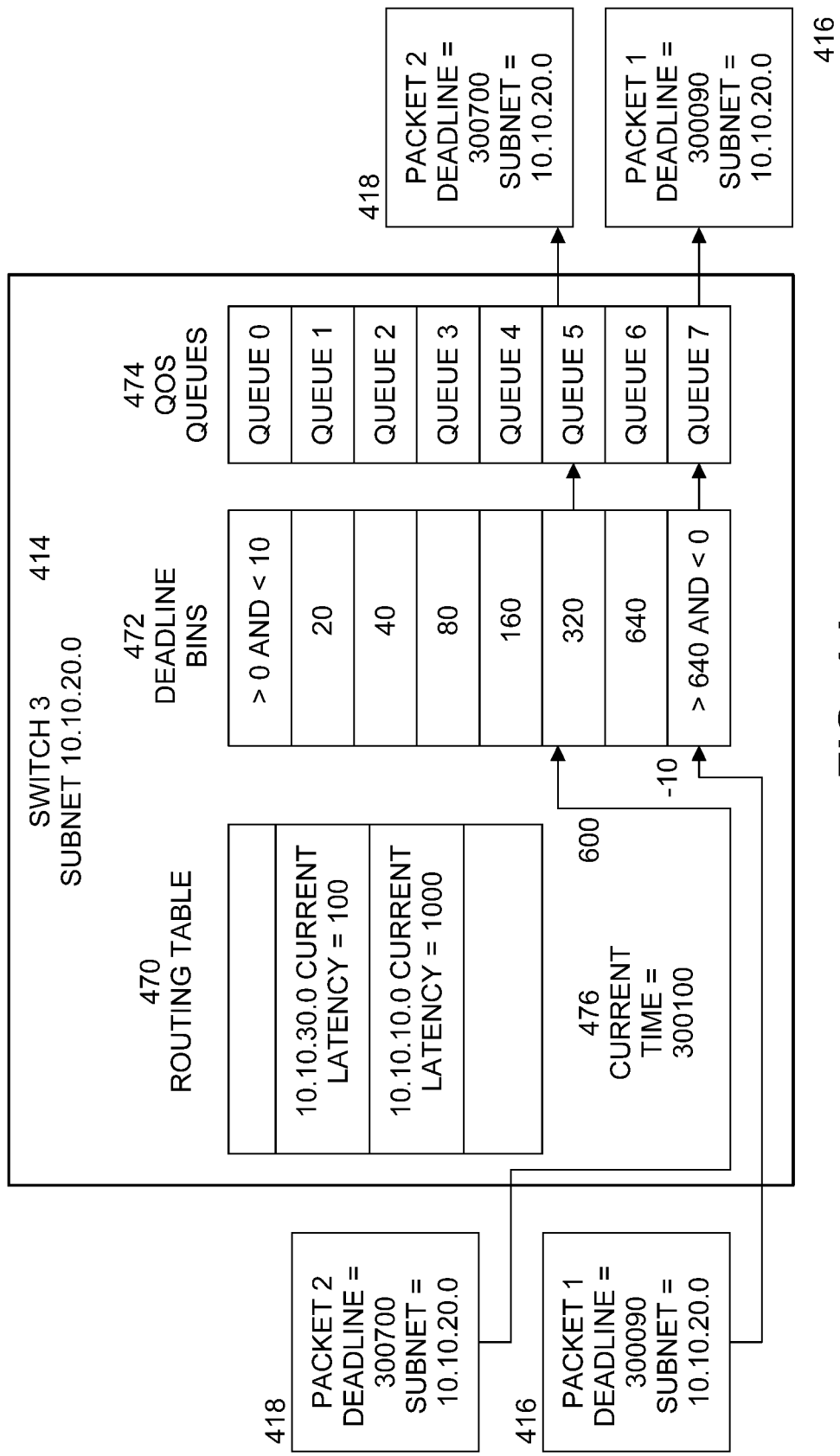

Turning now to FIG. 4d, switch 3 414 has a subnet IP address in this example of 10.10.20.0. Switch 3 414 receives packet 1 416 and packet 2 418 from router 1 410. Because this network node is a switch coupled to a destination (i.e., the switch is a destination subnet), routing table 470 is not used for packet 1 or packet 2 (no routing is necessary). Priority assignment is based on the deadline in the packet header. Packet processing logic 104-2 (not shown in FIG. 4d) in switch 3 414, based on the current time 476 in switch 3 414, calculates the remaining time to the deadline for each packet (e.g., packet 1 and packet 2) based at least in part on the deadline information in the packet headers. For example, the remaining time for packet 1 is –10 microseconds (300090–300100) and the remaining time for packet 2 is 600 microseconds (300700–300100). Packet processing logic 104-2 assigns packet 1 420 to the last deadline bin 472 with a limit of greater than 640 microseconds or less than zero microseconds (because the remaining time for packet 1 is less than zero). Packet processing logic 104-2 assigns packet 2 418 to the sixth deadline bin 472 with a limit of greater than 320 microseconds and less than 640 microseconds (because the remaining time for packet 2 is 600 microseconds). In an embodiment, each deadline bin 472 is associated with a corresponding QoS queue 474. Packet processing logic 104-2 processes QoS queues 474 and transmits packet 2 418 from queue 6 to destination 2 408 and packet 1 416 from the last queue to destination 2 408.

Figure 5:
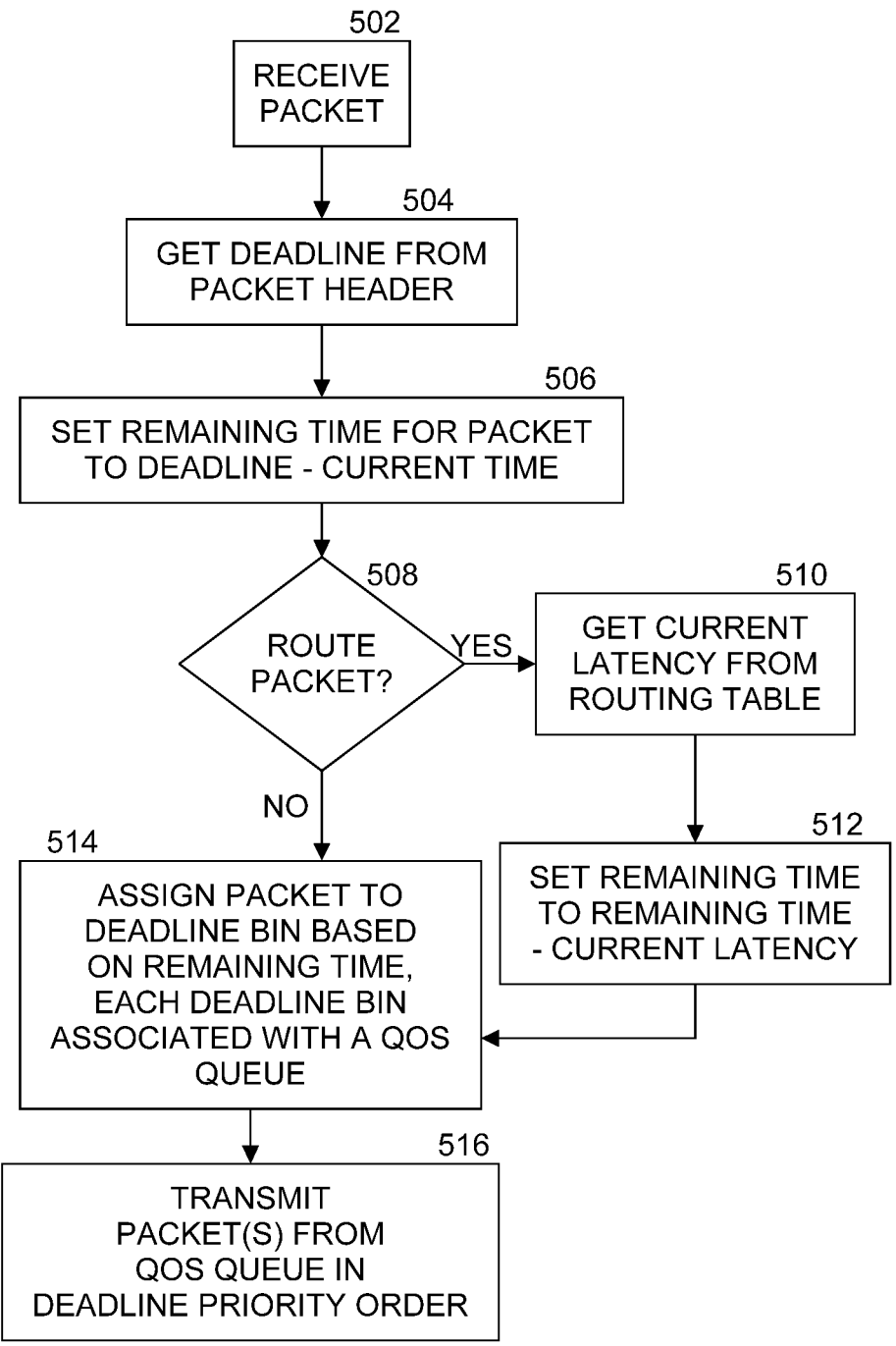
FIG. 5 illustrates a further example flow diagram of logic to process a packet.

FIG. 5 illustrates an example flow diagram of logic to process a packet. In an embodiment, per-packet QoS priorities are dynamically assigned by each deadline-aware network node (such as a router or a switch, for example). At block 502, packer receiver component 314 of packet processing logic 106 receives a packet. At block 504, reprioritization component 314 within packet processing logic 106 parses the packet header to get the packet deadline. At block 506, reprioritization component 316 of packet processing logic 106 sets the remaining time for the packet to the packet deadline minus the current time. At block 508, reprioritization component 316 determines if the packet is to be routed to another network node. If the packet is to be routed, reprioritization component 316 at block 510 gets the current latency for the path to the destination subnet (network node) from routing table 318. At block 512, reprioritization component 316 sets the remaining time for the packet to the remaining time minus the current latency. Processing continues with block 514. If at block 508 reprioritization component 316 determines the packet does not need to be routed (i.e., the current network node is the destination subnet, i.e., a switch), then processing skips blocks 510 and 512. At block 514, reprioritization component 316 assigns the packet to a deadline bin based at least in part on the remaining time, with each deadline bin being associated with a QoS queue. In an embodiment, the deadline bins are arranged in order from highest priority to lowest priority for subsequent transmission of packets. At block 516, one or more packets are transmitted from QoS queues in deadline priority order by packet transmitter component 317 of packet processing logic 106. In an embodiment, the deadline priority is the ordinal number of the QoS queue (which matches the deadline bins). In an embodiment, the QoS queues are arranged in order from highest priority to lowest priority for packet transmission. In other embodiments, the deadline bins and associated QoS queues may be configurable so that system users can optimize the reprioritization processing for specific data centers and/or workloads.

Figure 6:
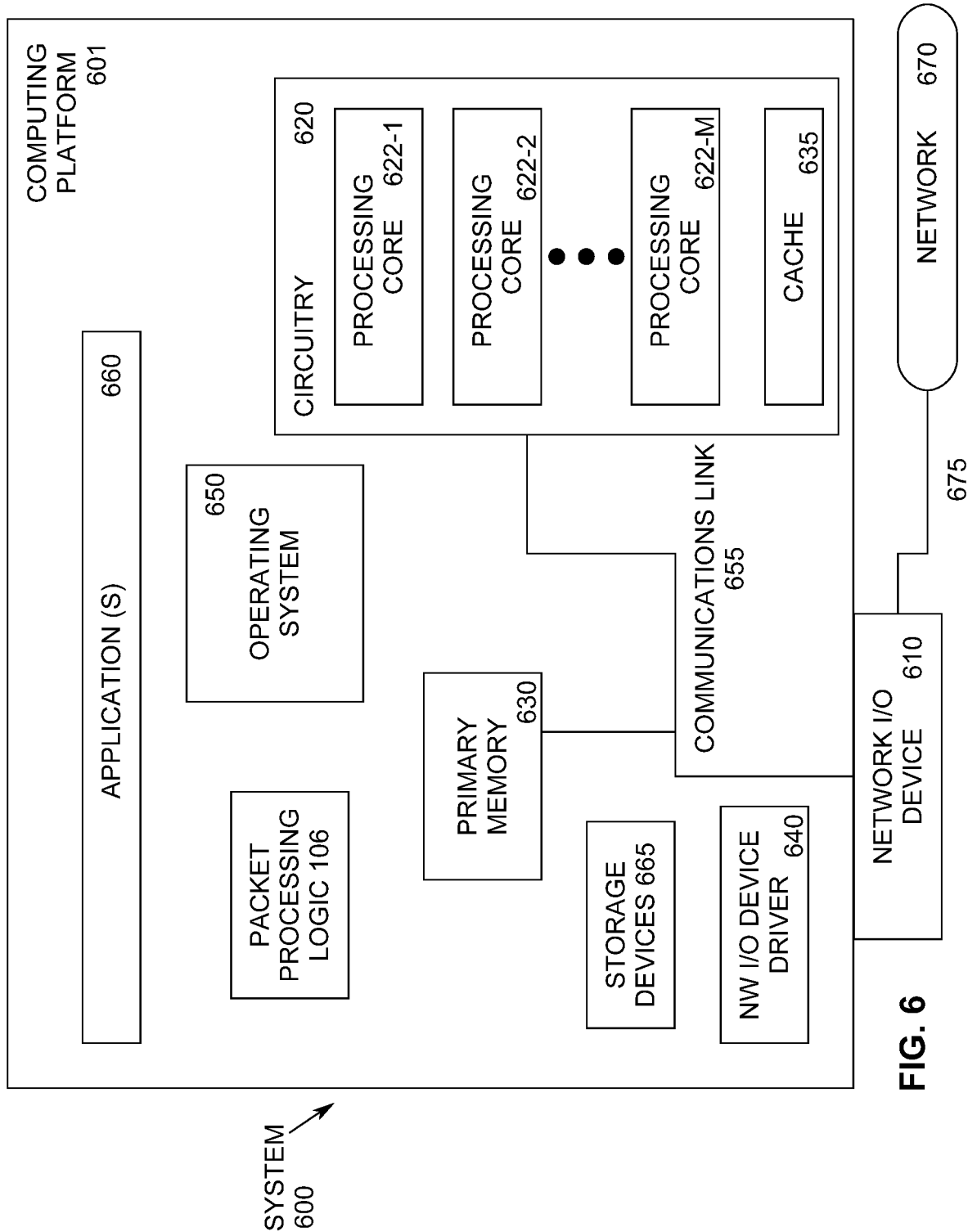
FIG. 6 illustrates an example computing platform.

FIG. 6 illustrates an example computing system 600. As shown in FIG. 6, computing system 600 includes a computing platform 601 coupled to a network 670. In some examples, as shown in FIG. 6, computing platform 601 may couple to network 670 (which may be the same as network 202 of FIG. 2, e.g., the Internet) via a network communication channel 675 and through a network I/O device 610 (e.g., a network interface controller (NIC)) having one or more ports connected or coupled to network communication channel 675.

According to some examples, computing platform 601, as shown in FIG. 6, may include circuitry 620, primary memory 630, a network (NW) I/O device driver 640, an operating system (OS) 650, one or more application(s) 660, storage devices 665, and packet processing logic 106. In an embodiment, packet processor 104 of FIG. 1 is implemented as packet processing logic 106, and packet filter rules (PFRs), packets, packet metadata, routing tables, deadline bins, and QoS queues are stored in one or more of primary memory 630 and/or storage devices 665. In at least one embodiment, storage devices 665 may be one or more of hard disk drives (HDDs) and/or solid-state drives (SSDs). In an embodiment, storage devices 665 may be non-volatile memories (NVMs). In some examples, as shown in FIG. 6, circuitry 620 may communicatively couple to primary memory 630 and network I/O device 610 via communications link 655. Although not shown in FIG. 6, in some examples, operating system 650, NW I/O device driver 640 or application(s) 660 may be implemented, at least in part, via cooperation between one or more memory devices included in primary memory 630 (e.g., volatile or non-volatile memory devices) and elements of circuitry 620 such as processing cores 622-1 to 622-$m$, where "m" is any positive whole integer greater than 2. In an embodiment, packet processing logic 106 may be executed by one or more processing cores 622-1 to 622-$m$ to process packets by applying PFRs to the packets.

In some examples, computing platform 601, may include, but is not limited to, a server, a server array or server farm, a web server, a network server, an Internet server, a work station, a mini-computer, a main frame computer, a super-computer, a network appliance, a web appliance, a distributed computing system, multiprocessor systems, processor-based systems, a laptop computer, a tablet computer, a smartphone, or a combination thereof. Also, circuitry 620 having processing cores 622-1 to 622-$m$ may include various commercially available processors, including without limitation Intel® Atom®, Celeron®, Core (2) Duo®, Core i3, Core i5, Core i7, Itanium®, Pentium®, Xeon® or Xeon Phi® processors; ARM processors, and similar processors. Circuitry 620 may include at least one cache 635 to store data.

According to some examples, primary memory 630 may be composed of one or more memory devices or dies which may include various types of volatile and/or non-volatile memory. Volatile types of memory may include, but are not limited to, dynamic random-access memory (DRAM), static random-access memory (SRAM), thyristor RAM (TRAM) or zero-capacitor RAM (ZRAM). Non-volatile types of memory may include byte or block addressable types of non-volatile memory having a 3-dimensional (3-D) cross-point memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto-resistive random-access memory (MRAM) that incorporates memristor technology, spin transfer torque MRAM (STT-MRAM), or a combination of any of the above. In another embodiment, primary memory 630 may include one or more hard disk drives within and/or accessible by computing platform 601.

Figure 7:
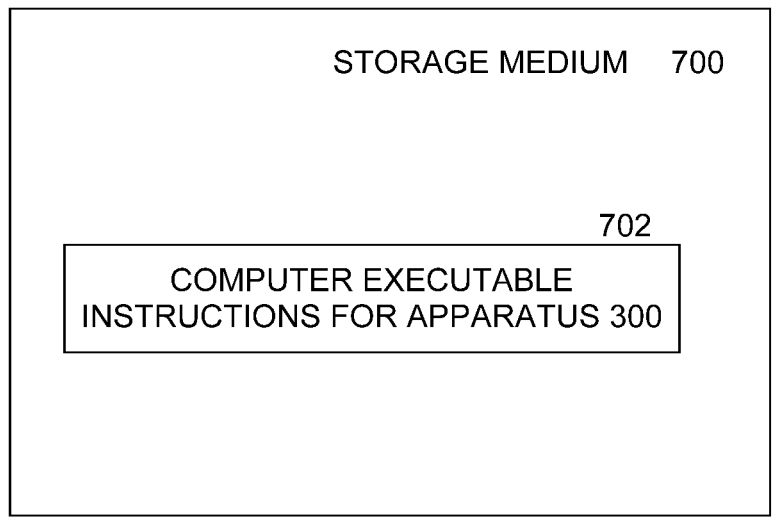
FIG. 7 illustrates an example of a storage medium.

FIG. 7 illustrates an example of a storage medium 700. Storage medium 700 may comprise an article of manufacture. In some examples, storage medium 700 may include any non-transitory computer readable medium or machine readable medium, such as an optical, magnetic or semiconductor storage. Storage medium 700 may store various types of computer executable instructions, such as instructions 702 for apparatus 300 to implement logic flow 500 of FIG. 5. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
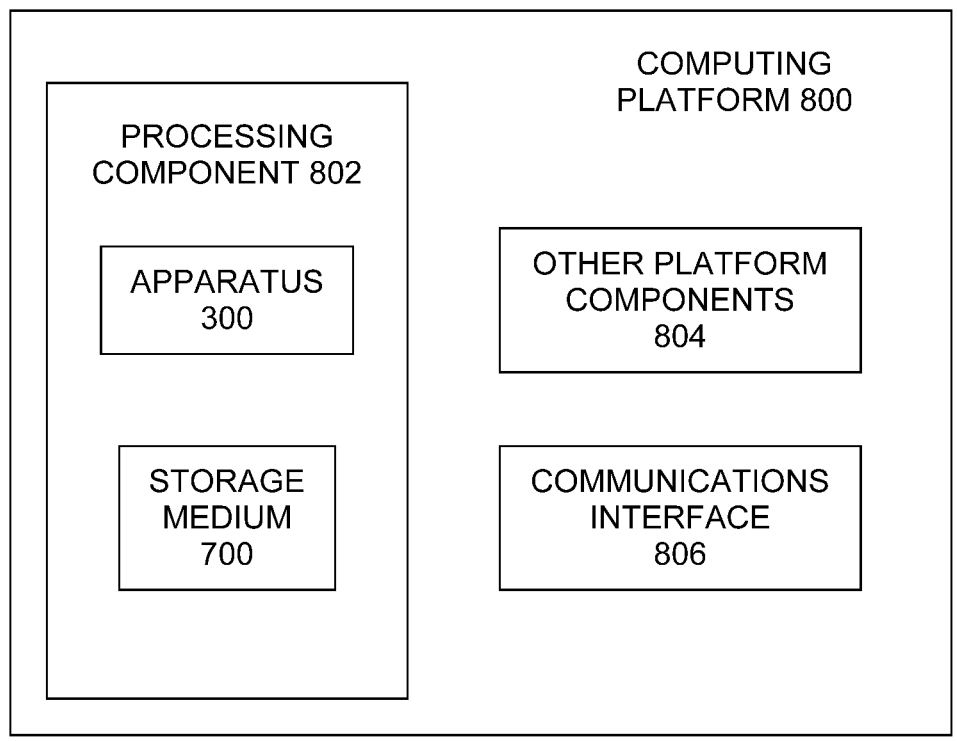
FIG. 8 illustrates another example computing platform.

FIG. 8 illustrates an example computing platform 800. In some examples, as shown in FIG. 8, computing platform 800 may include a processing component 802, other platform components 804 and/or a communications interface 806.

According to some examples, processing component 802 may execute processing operations or logic for apparatus 300 and/or storage medium 700. Processing component 802 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 804 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), types of non-volatile memory such as 3-D crosspoint memory that may be byte or block addressable. Non-volatile types of memory may also include other types of byte or block addressable non-volatile memory such as, but not limited to, multi-threshold level NAND flash memory, NOR flash memory, single or multi-level PCM, resistive memory, nanowire memory, FeTRAM, MRAM that incorporates memristor technology, STT-MRAM, or a combination of any of the above. Other types of computer readable and machine-readable storage media may also include magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 806 may include logic and/or features to support a communication interface. For these examples, communications interface 806 may include one or more communication interfaces that operate according to various communication protocols or standards to communicate over direct or network communication links or channels. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Switch Specification.

The components and features of computing platform 800 may be implemented using any combination of discrete circuitry, ASICs, logic gates and/or single chip architectures. Further, the features of computing platform 800 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 800 shown in the block diagram of FIG. 8 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASIC, programmable logic devices (PLD), digital signal processors (DSP), FPGA, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Included herein are logic flows or schemes representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow or scheme may be implemented in software, firmware, and/or hardware. In software and firmware embodiments, a logic flow or scheme may be implemented by computer executable instructions stored on at least one non-transitory computer readable medium or machine readable medium, such as an optical, magnetic or semiconductor storage. The embodiments are not limited in this context.

Some examples are described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   a packet receiver to receive a packet, the packet including
      a packet header having a deadline and a destination network node;
   a routing table including a current latency for a path to the destination network node for the packet;
   a component coupled to the packet receiver and the routing table to get the deadline for delivery of the packet to the destination network node, to set a remaining time for the packet to the deadline minus a current time, to subtract the current latency from the remaining time when the packet is to be routed, and to assign the packet to one of a plurality of deadline bins based at least in part on the remaining time, each deadline bin associated with one of a plurality of transmit queues, the plurality of deadline bins arranged in a deadline priority order from a highest priority to a lowest priority; and
   a packet transmitter to transmit packets from the plurality of transmit queues, the plurality of transmit queues being accessed in the deadline priority order.

2. The apparatus of claim 1, the reprioritization component to periodically update the current latency.

3. The apparatus of claim 1, the packet header including an IP options field to store the deadline.

4. The apparatus of claim 1, the destination network node being identified by a subnet IP address.

5. A method comprising:
   receiving a packet, the packet including a packet header having a deadline and a destination network node;
   getting the deadline for delivery of the packet to the destination network node;
   setting a remaining time for the packet to the deadline minus a current time;
   subtracting a current latency for a path to the destination network node for the packet from a routing table from the remaining time when the packet is to be routed;
   assigning the packet to one of a plurality of deadline bins based at least in part on the remaining time, each deadline bin associated with one of a plurality of transmit queues, the plurality of deadline bins arranged in a deadline priority order from a highest priority to a lowest priority; and
   transmitting packets from the plurality of transmit queues, the plurality of transmit queues being accessed in the deadline priority order.

6. The method of claim 5, comprising periodically updating the current latency.

7. The method of claim 5, the packet header including an IP options field to store the deadline.

8. The method of claim 5, the destination network node being identified by a subnet IP address.

9. A processing system comprising:
   a router including
   a first packet receiver to receive a packet, the packet including a packet header having a deadline and a destination network node;
   a routing table including a current latency for a path to the destination network node for the packet;
   a first component coupled to the first packet receiver and the routing table to get the deadline for delivery of the packet to the destination network node, to set a first remaining time for the packet to the deadline minus a current time, to subtract the current latency from the first remaining time when the packet is to be routed, and to assign the packet to one of a first plurality of deadline bins based at least in part on the first remaining time, each deadline bin associated with one of a first plurality of transmit queues, the first plurality of deadline bins arranged in a first deadline priority order from a highest priority to a lowest priority; and a first packet transmitter to transmit packets from the first plurality of transmit queues, the first plurality of transmit queues being accessed in the first deadline priority order; and a switch including a second packet receiver to receive the packet;

a second component coupled to the second packet receiver to get the deadline for delivery of the packet to the destination network node, to set a second remaining time for the packet to the deadline minus a current time, and to assign the packet to one of a second plurality of deadline bins based at least in part on the second remaining time, each deadline bin associated with one of a second plurality of transmit queues, the second plurality of deadline bins arranged in a second deadline priority order from a highest priority to a lowest priority; and a second packet transmitter to transmit packets from the second plurality of transmit queues, the second plurality of transmit queues being accessed in the second deadline priority order.

10. The processing system of claim 9, the first component to periodically update the current latency.

11. The processing system of claim 9, the packet header including an IP options field to store the deadline.

12. The processing system of claim 9, the destination network node being identified by a subnet IP address.

13. At least one tangible machine readable medium comprising a plurality of instructions that in response to being executed by a processing system cause the processing system to: receive a packet, the packet including a packet header having a deadline and a destination network node; to get the deadline for delivery of the packet to the destination network node; to set a remaining time for the packet to the deadline minus a current time; to subtract a current latency for a path to the destination network node for the packet from a routing table from the remaining time when the packet is to be routed; to assign the packet to one of a plurality of deadline bins based at least in part on the remaining time, each deadline bin associated with one of a plurality of transmit queues, the plurality of deadline bins arranged in a deadline priority order from a highest priority to a lowest priority; and to transmit packets from the plurality of transmit queues, the plurality of transmit queues being accessed in the deadline priority order.

14. The at least one tangible machine readable medium of claim 13, comprising instructions to periodically update the current latency.

15. The at least one tangible machine readable medium of claim 13, wherein the packet header includes an IP options field to store the deadline.

16. The at least one tangible machine readable medium of claim 13, the destination network node being identified by a subnet IP address.

* * * * *